(12) United States Patent
Vieira Pereira et al.

(10) Patent No.: US 12,492,948 B2
(45) Date of Patent: Dec. 9, 2025

(54) OPTICAL SYSTEM FOR MEASURING WATER-OIL INTERFACE LEVEL FROM FLUID THERMAL PROPERTIES

(71) Applicants: Petróleo Brasileiro S.A.—Petrobras, Rio de Janeiro (BR); Universidade Federal Do Espírito Santo—UFES, Vitória (BR)

(72) Inventors: Luiz Octavio Vieira Pereira, Rio de Janeiro (BR); Renan Costa Lazaro, Vitória (BR); Anselmo Frizera Neto, Vitória (BR); Katiuski Pereira Nascimento, Vitória (BR); Arnaldo Gomes Leal Junior, Vitória (BR)

(73) Assignees: Petróleo Brasileiro S.A.—Petrobras, Rio de Janeiro (BR); Universidade Federal Do Espírito Santo—UFES, Vitória (BR)

( * ) Notice: Subject to any disclaimer, the term of this patent is extended or adjusted under 35 U.S.C. 154(b) by 475 days.

(21) Appl. No.: 17/992,025

(22) Filed: Nov. 22, 2022

(65) Prior Publication Data
US 2023/0168137 A1 Jun. 1, 2023

(30) Foreign Application Priority Data
Nov. 26, 2021 (BR) ...................... 10 2021 023978 6

(51) Int. Cl.
*G01K 11/3206* (2021.01)
*G01F 23/22* (2006.01)
(Continued)

(52) U.S. Cl.
CPC .......... *G01K 11/3206* (2013.01); *G01F 23/22* (2013.01); *G01K 1/026* (2013.01);
(Continued)

(58) Field of Classification Search
CPC .... G01K 11/3206; G01K 1/026; G01F 23/22; G01F 23/292; G01V 8/16; G02B 6/02076
See application file for complete search history.

(56) References Cited

U.S. PATENT DOCUMENTS 4,880,990 A 11/1989 Rando
10,422,706 B1 * 9/2019 Parker, Jr. .......... G01K 11/3206
(Continued)

FOREIGN PATENT DOCUMENTS

BR 112020019910 A2 1/2021
CN 111678615 A * 9/2020
(Continued)

OTHER PUBLICATIONS

CN-111678615-A, English Translation (Year: 2020).*
(Continued)

*Primary Examiner* — Ryan D Walsh
(74) *Attorney, Agent, or Firm* — Morrison & Foerster LLP (57) ABSTRACT

The present invention proposes a system for measuring the water-oil interface level based on the fluid thermal properties. To overcome limitations related to the interface level in oil separation processes, an interface level sensor must detect water, oil, emulsion and foam layers. Furthermore, maintenance costs must be low and the time between maintenance must be high, in order to obtain high production rates and more reliable control of the oil separators. Optical system for measuring the water-oil interface level from fluid thermal properties comprises single-mode optical fiber (1), FBG (2), PTFE tube (3), connection (4), flange (5), optical connectors (6) and optical interrogator (7).

10 Claims, 4 Drawing Sheets
(4 of 4 Drawing Sheet(s) Filed in Color)

(51) Int. Cl.
*G01F 23/292* (2006.01)
*G01K 1/02* (2021.01)
*G01V 8/16* (2006.01)
*G02B 6/02* (2006.01)

(52) U.S. Cl.
CPC .............. *G01F 23/292* (2013.01); *G01V 8/16* (2013.01); *G02B 6/02076* (2013.01)

(56) References Cited

U.S. PATENT DOCUMENTS

| | | | |
|---|---|---|---|
| 2016/0266265 A1* | 9/2016 | Kruspe | G01K 11/3206 |
| 2021/0148746 A1* | 5/2021 | Hallot | G01L 15/00 |
| 2024/0060918 A1* | 2/2024 | Vieira Pereira | G01K 17/20 |
| 2025/0012694 A1* | 1/2025 | Pereira | G01N 13/00 |

FOREIGN PATENT DOCUMENTS

| | | | | |
|---|---|---|---|---|
| CN | 113137999 A | * | 7/2021 | |
| CZ | 34467 U1 | * | 10/2020 | |
| EA | 027715 B1 | | 8/2017 | |
| WO | WO-2014001714 A1 | * | 1/2014 | ........... G01F 23/165 |

OTHER PUBLICATIONS

CN-113137999-A, English Translation (Year: 2021).*
CZ-34467-U1, English Translation (Year: 2020).*
WO-2014001714-A1, English Translation (Year: 2014).*
Corrosion Resistant FBG-Based Quasi-Distributed Sensor for Crude Oil Tank Dynamic Temperature Profile Monitoring; Marques et al.; Published: Dec. 5, 2015; Sensors 2015, 15, 30693-30703; doi: 10.3390/s151229811 (Year: 2015).*
Micron Optics; Optical Sensing Interrogator | sm125 (Year: 2009).*

* cited by examiner

Actual Classes

|   | 1 | 2 | 3 | 4 | 5 | 6 | 7 |
|---|---|---|---|---|---|---|---|
| 1 | 100% | 0 | 0 | 0 | 0 | 0 | 0 |
| 2 | 0 | 100% | 0 | 0 | 0 | 0 | 0 |
| 3 | 0 | 0 | 99.37% | 0.01 | 0 | 0 | 0 |
| 4 | 0 | 0 | 0.01% | 99.32% | 0 | 0 | 0 |
| 5 | 0 | 0 | 0 | 0 | 100% | 0 | 0 |
| 6 | 0 | 0 | 0 | 0 | 0 | 100% | 0 |
| 7 | 0 | 0 | 0 | 0 | 0 | 0 | 100% |

Estimated Classes

OPTICAL SYSTEM FOR MEASURING WATER-OIL INTERFACE LEVEL FROM FLUID THERMAL PROPERTIES

CROSS-REFERENCE TO RELATED APPLICATION

This application claims priority to Brazilian Application No. 10 2021 023978 6, filed on Nov. 26, 2021, and entitled "OPTICAL SYSTEM FOR MEASURING WATER-OIL INTERFACE LEVEL FROM FLUID THERMAL PROPERTIES," the disclosure of which is incorporated herein by reference in its entirety.

FIELD OF INVENTION

The present invention relates to measuring the interface level between fluids produced from wells in tanks, reservoirs, processing vessels and storage vessels. The proposed invention can be applied in several storage, production tanks or three-phase separators onshore or offshore.

DESCRIPTION OF THE STATE OF THE ART

In the oil and gas industry, there is a need to measure the interface level between fluids in tanks, reservoirs, processing vessels and storage vessels for fluids with different density, corrosivity and viscosity. Furthermore, processes in the oil and gas industry take place under conditions of high pressure and temperature, which increases the complexity and robustness requirements for instrumentation.

One of the main processes in the oil and gas industry is the separation of oil, water and gas. The hydrocarbons obtained from producing wells are a mixture of oil, gas, produced water and suspended solids. These different components are separated in the oil separation unit, which generally makes the separation between oil, gas and water through the density difference of the immiscible fluids. However, there are no laminar and well-defined layers for each of the fluids. Instead, there is an emulsion layer between the oil and the water, which is affected in composition and behavior by the properties of the water and oil. In addition, there may be foam formation between the layers of oil and gas in atmospheric tanks, which also have a dynamic behavior. The foam and emulsion layer can introduce errors in the measurement of interface level sensors. There may also be mud or wax formation on the tank walls, and sludge in the bottom, which can also impair the performance of the sensors.

In addition to the operational problems of measuring interface levels caused by the formation of emulsion and foam layers, there are also limitations in current level measurement technologies due to the variety of fluids, operation in harsh environments and safety concerns related to the explosive atmosphere generated. The presence of flammable gases in oil tanks can cause explosions and, for this reason, the devices used in the tank instrumentation cannot exceed certain voltage, current and capacitance limits.

Possible unreliability in multi-interface level measurement systems leads to simplified control strategies in oil separators. This limitation in the measurement of the interface level implies the installation of several separators in series in order to obtain a better efficiency in the separation of each phase of the fluid, which increases the plant costs and complexity maintenance. If the separation between oil and water does not occur properly, the presence of a large amount of water in the oil will negatively influence the costs and efficiency of subsequent processes. Another point of attention is the contamination of the environment with oil containing water.

One of the conventional (and oldest) techniques for measuring the interface in tanks is through the use of a hand ruler. In this case, an employee manually lowers a ruler into the tank until reaching the total oil level and the water-oil interface. In addition to the measurement not being continuous and automatic, this technique involves the transit of employees in classified areas, exposure to toxic gases and working at heights, which creates a risk for employees.

Aiming at continuous measurement techniques and with less dependence on employees in classified areas, different continuous measurement techniques were proposed, as described below.

Sensors based on buoys (or displacers): these sensors assume that a body with a density between the density of fluids (greater than that of oil and less than that of water, for example) will be positioned at the interface between these two liquids. For this reason, the sensor is composed of a float that has a density greater than that of the oil and less than that of water. The buoys movement indicates the water and oil level. Although this sensor has the advantages of low cost and simplicity, it can only measure sharp differences in densities. Therefore, if the interface density is not constant due to the presence of an emulsion layer, the displacer response will be unstable. Furthermore, the thickness of the foam layer cannot be measured with this approach.

Differential Pressure Based Sensors: These sensors employ the hydrostatic pressure difference to estimate the interface level. Since hydrostatic pressure depends on the density of the liquid and density varies with temperature, a compensation temperature may be required when this approach is employed. Although some configurations can only detect the interface level if the fluids have a large difference in density, it is possible to apply configurations with multiple pressure sensors or with a pressure sensor moving vertically along the tank to estimate the level of multiple interfaces when there is low density variation or when there is an emulsion layer. By applying multiple pressure sensors, it is possible to further increase their accuracy with sensor fusion algorithms.

In addition to the temperature compensation requirement, another limitation is the possibility of scale formation in the pressure transmitter, which will impair its performance. Temperature dependency is a common limitation of some technologies for liquid level detection and can be overcome by having a temperature sensor next to each pressure sensor to compensate the temperature effects.

Multi-electrode array capacitance sensors: this principle is based on measuring the dielectric constant of the fluid between the capacitive plates. The charging and discharging circuit is low cost and the foam layer can be detected by analyzing the capacitance fluctuation in the frequency domain. For this reason, different configurations have been proposed over the years.

Two configurations are possible. The first is based on two independent columns, one with excitation electrodes and the other column with detection electrodes. The second configuration has a single column of electrodes using the tank metallic wall as a support for the sensors.

The limitation of this approach are the problems caused by conductive liquids. When the oil has a water content greater than 40% of its volume, the capacitance measurement may lose sensitivity, which leads to estimation errors. In addition, the formation of fouling in the sensor can impair its functioning and the current limitation of the electrodes is also an important disadvantage.

Ultrasound-Based Sensors: An ultrasound-based sensor employs a transmitter and a receiver in a transmission medium. The different interfaces are detected by differences in the acoustic impedance of each layer, which is related to the density and sound speed in the medium. Another approach is to place the transmitter and receiver facing each other on vertical stands. Thus, with the vertical movement of both the transmitter and the receiver along the tank with the multiphase liquid, identification of the liquid can be made and each interface level can be estimated.

It is also possible to estimate the liquid level with multiple interfaces with an array of ultrasonic transducers, which can be positioned in two columns, one for the emitter and one for the receiver. A similar approach can be taken, but applying a single column. In this configuration, the ultrasonic transducers are activated in a time multiplexing configuration.

These sensors generally need temperature compensation and a compensation for the density variation of each liquid, which are obtained by applying reference sensors for temperature and pressure, respectively. Additionally, the presence of bubbles, fouling, and mud can degrade sensor performance. Another limitation is the difficulty of estimating the level of emulsion and foam layers, which can be obtained with artificial neural networks and pattern recognition algorithms. A challenge is the need to limit the power used to meet safety requirements in explosive atmospheres.

Radiation-based sensors: this approach comprises a low-energy gamma-ray emitter in a vertical array, which is measured by Geiger detectors. The attenuation measured by the detectors is related to the density of the fluid present in the medium. This technology can operate in aggressive environments with high temperature, pressure and corrosive materials, and can reliably measure all interfaces. However, it has higher costs than the other technologies presented. In addition, there are safety concerns related to the dangerous nucleonic radiation from these devices and legal requirements to be met.

Document U.S. Pat. No. 4,880,990A discloses a liquid level measuring system comprising a sensor for making an optical measurement of a certain liquid level in the container and a remote-control unit for that sensor element.

Document BR112020019910A2 discloses a device for determining the interface level of a polyphasic system comprising a reservoir intended to receive a polyphasic system, comprising at least two fluids that have different phases, and a tube immersed vertically inside the reservoir, said tube being intended to be filled with a fluid having the same pressure as the fluid contained within the reservoir, the tube comprising a plurality of membrane differential pressure sensors spaced vertically from one another along the tube for measuring the pressure difference between the fluids contained and stratified in height within the reservoir and the fluid contained within the tube.

Document EA027715B1 discloses a method and a device for regulating an oil-water interface level in the dynamic stabilization process of an oil emulsion.

The presented prior art does not have the ability to measure the interface level between two fluids from thermal properties.

In view of the difficulties present in the state of the art above mentioned and for measuring solutions the water-oil interface level from the thermal fluids properties, it arises the need to develop a technology capable of performing effectively and that is in accordance with the environmental and safety guidelines. The state of the art above mentioned does not have the unique characteristics that will be presented in detail below.

OBJECT OF THE INVENTION

It is an object of the invention to be applied in the measurement of storage, production tanks or three-phase separators onshore or offshore.

It is also an objective of the invention to be applied on oil production platforms and, practically, in all processes of the oil industry, due to its ability to distinguish between layers of water, oil and air/gas.

BRIEF DESCRIPTION OF THE INVENTION

The present invention proposes a system for measuring the water-oil interface level based on the thermal properties of the fluid. To overcome limitations related to the interface level in oil separation processes, an interface level sensor must detect water, oil, emulsion and foam layers. Furthermore, maintenance costs must be low and the time between maintenance must be high, in order to obtain high production rates and more reliable control of the oil separators.

The optical system for measuring the water-oil interface level from the thermal fluid properties comprises single-mode optical fiber (1), FBG (2), PTFE tube (3), connection (4), flange (5), optical connectors (6) and optical interrogator (7).

BRIEF DESCRIPTION OF DRAWINGS

The patent or application file contains at least one drawing executed in color. Copies of this patent or patent application publication with color drawing(s) will be provided by the Office upon request and payment of the necessary fee.

The present invention will be described in more detail below, with reference to the attached figures which, in a schematic and not limiting of the inventive scope, represent examples of its realization. In the drawings, there are.

DETAILED DESCRIPTION OF THE INVENTION

Below follows a detailed description of a preferred embodiment of the present invention, by way of example and in no way limiting. Nevertheless, it will be clear to a person skilled in the art, from the reading of this description, possible additional embodiments of the present invention further comprised by the essential and optional features below.

To overcome limitations related to the interface level in oil separation processes, an interface level sensor must detect water, oil, emulsion and foam layers. Furthermore, maintenance costs must be low and the time between maintenance must be high, in order to obtain high production rates and more reliable control of the oil separators. In addition, the device must be intrinsically safe and capable of operating in classified areas. If a device is able to meet these requirements, it will provide a more effective use of the separator, which also includes the design of more compact separators, with greater safety and efficiency.

Fiber optic sensors are innovative technologies that result in devices that are compact, lightweight, immune to electromagnetic fields, chemically stable and allow multiplexing, that is, dozens of sensors can be used in the same fiber optic cable. In addition, they can be considered intrinsically safe, especially when compared to conventional electronic technologies. Fiber optic sensors have been used in industrial applications to measure several parameters, such as temperature, liquid level, acceleration, pressure, acoustic index and refractive index. One of the main sensor devices used in optical fibers is the Fiber Bragg Grating (FBG) which consists of a periodic disturbance pattern in the refractive index of the fiber that allows the reflection of an optical signal of predefined wavelength and proportional to the period of the periodic disturbance and to the refractive index of the optical fiber. This reflected signal is intrinsically sensitive to medium temperature variations and deformations applied to the optical fiber, since such parameters result in small variations in the disturbance period of the refractive index which, in turn, result in small variations in the wavelength reflected, such variations are proportional to the temperature or deformation applied to the optical fiber.

The advantages of fiber optic sensors and their wide use in industry make them an interesting option for interface level detection. Among the various interface detection methods between liquids, a new proposed approach uses the differences in the thermal properties of each liquid, mainly water and oils in general, which have significant differences. Therefore, the analysis of the thermal dynamics in a separator can indicate the interface level differences between different immiscible fluids. Since the FBG is intrinsically sensitive to temperature variations, it is possible to use it directly in interface level detection from thermal dynamic variations. This approach is advantageous because it eliminates the need to use transducer elements, as in the case of measurement by hydrostatic pressure, which results in a more compact, lighter and lower cost system, with a smaller number of components. In addition, the use of optical fibers brings advantages related to device safety, since they are dielectric, corrosion resistant, immune to electromagnetic fields and intrinsically safe operation, all necessary requirements for applications in classified areas. It is also important to note that the multiplexing capacity of these sensors allows several measurement points to be incorporated into the same fiber optic cable, which brings great operational and economic advantages, since the same sensor reading device can be applied to a greater number of tanks and/or separators, contributing to the cost of the device being diluted by the amount of assets to be monitored. Another important operational advantage is the possibility of customizing the number of sensors and their positions in the tank to adapt or optimize their operation in relation to the dimensional and operational characteristics of each tank or processing unit.

Figure 4:
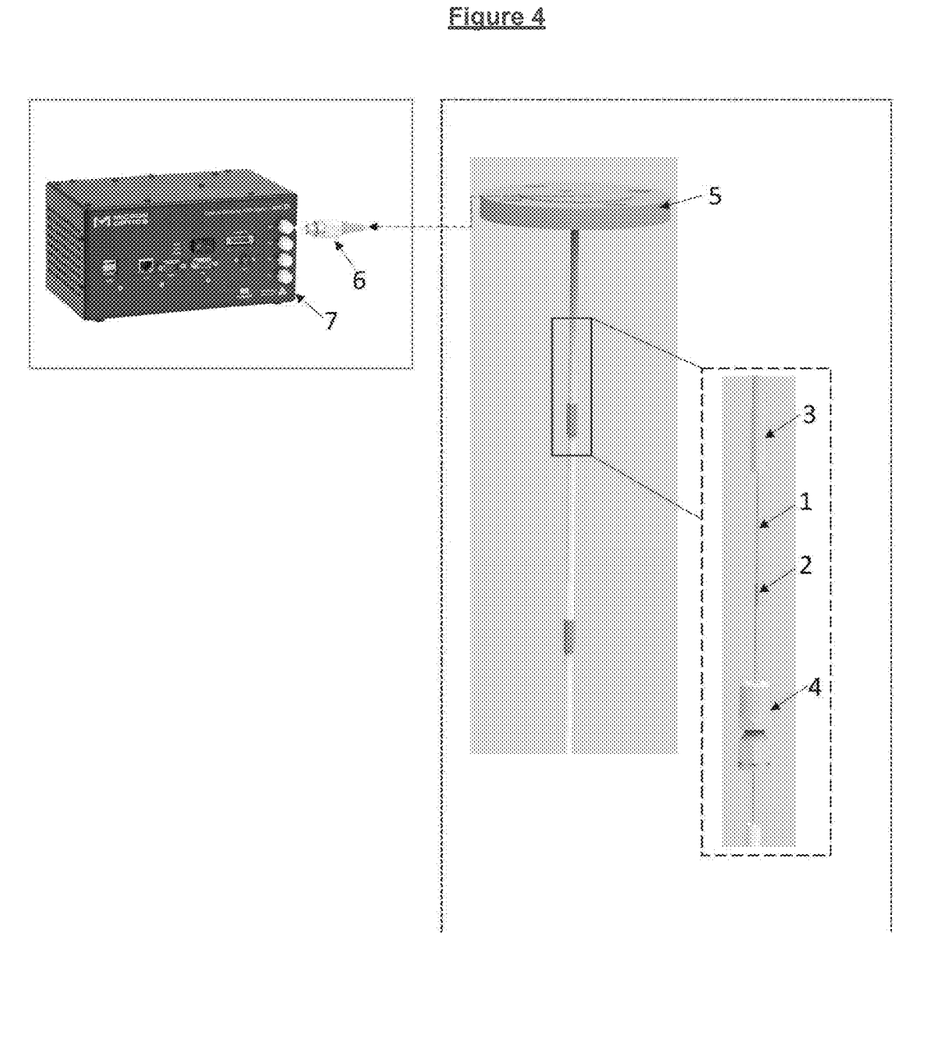
FIG. 4 illustrates the schematic representation of the proposed device and the exploded view.

As shown in FIG. 4, in the constructive aspect of the invention, the main element is the FBG (2) recorded in single-mode optical fiber (1) from a beam of UV light that generates periodic disturbance with permanent changes in the refractive index of the optical fiber in the region where it was applied. Therefore, it is possible to record dozens of FBGs in the same optical fiber, depending on the desired performance parameters for the interface level sensor. The single-mode optical fiber (1) with the set of FBGs (2) is inserted into a PTFE tube (3) which, in addition to being resistant to oil, provides mechanical protection to the single-mode optical fiber (1). The region where each FBG (2) was recorded is positioned in a stainless steel connection (4) to provide the necessary mechanical protection for the FBG (2) and a faster heat exchange between the medium and the optical fiber due to the high thermal conduction coefficient of metals. It is important to note that the stainless steel connection (4) is also oil resistant. Each stainless steel connection (4) is positioned between the PTFE tubes (3) which, in turn, are connected to the flange (5), as shown in the FIG. 4. The function of the flange (5) is to connect the sensing system to the tank in which it will be installed. The great data transmission capacity of the optical fiber means that cables of hundreds (or even thousands) meters can be used for the transmission of the sensor signal, which results in the possibility of positioning the systems for reading the signal of the FBGs (2) in a control room away from an area of greater danger or in an area of lower risk. To connect the measurement system to the reading system, optical connectors (6) are used and connected to each channel of the optical interrogator (7), reading system and acquisition of the optical signal. The optical interrogator (7) consists of a broadband optical source, an optical circulator and an optical detector set that allow the user to be provided with the optical spectrum reflected from the sensor, that is, the necessary optical power and wavelength information for analysis and signal processing from sensors.

In the development of the Optical System for Measuring the Water-Oil Interface Level from the Thermal Properties of Fluids with the constructive methodology/way with FBGs embedded in diaphragms, in addition to the diaphragm geometry analysis, there is also the need to estimate the number of sensor elements in the profiler. In this case, the analyzes were carried out considering a 2-meter high tank, precisely because they are related to the levels of the tanks used in the validation tests, both in NEMOG-UFES and in NEAT. The analyzes of the number of FBGs sensors embedded in diaphragms necessary and sufficient for measuring the interface level showed that the number of sensors to be used in the Beta prototype is 6 equidistant sensors. As pressure or level sensors based on FBGs are also sensitive to temperature variations, each element of the optical profiler (composed of a diaphragm with built-in FBG) has a temperature sensor (also based on FBGs, but outside the diaphragm structure and isolated of deformations) corresponding precisely to compensate the temperature cross-sensitivity effects on the interface level measurement and, consequently, reduce errors in the estimation of the water-oil interface level. Therefore, the feasibility analyzes of the temperature sensors use for estimating the interface level through the analysis of the thermal properties of the fluid were carried out using the 6 FBGs for temperature measurement (that is, isolated from significant deformations) present in the prototype used in the oil tank tests. In addition, an additional temperature FBG sensor was positioned 25 cm above the sixth temperature sensor (FBG6 represented in FIG. 1) as an additional point for temperature measurement, mainly for cases where the tank is not completely full and this seventh sensor (FBG7) serves as a reference for the air/gas temperature at the top of the tank.

Figure 1:
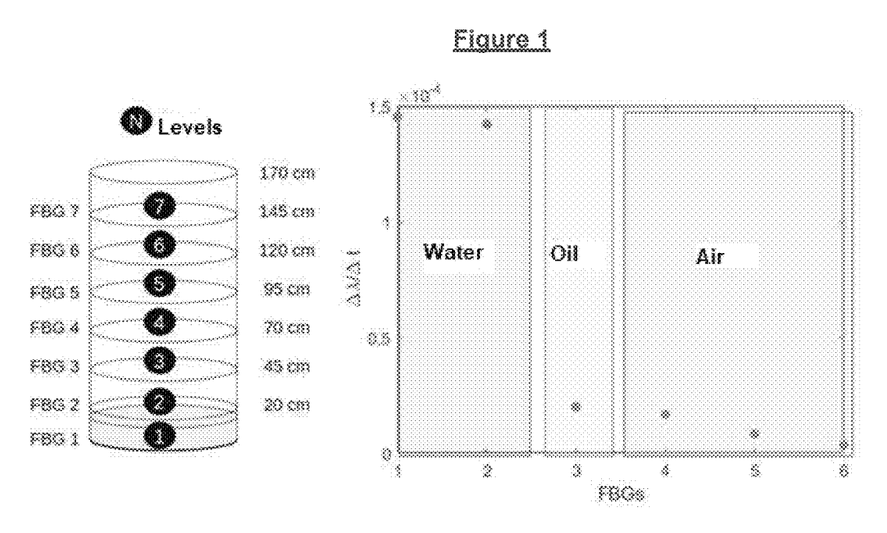
FIG. 1 illustrates a schematic representation of the proposed device and the exploded view.

Different tests with variation of the water-oil interface level were performed, while the data from the temperature sensors were acquired by the optical interrogator Micron Optics sm125 at an acquisition frequency of 2 Hz. The tests consisted of positioning the interface level under different conditions, where the water and oil levels were measured through the tank's transparent display. To test the feasibility of estimating the interface level through the response of the temperature sensors, the different positions of the interface level were chosen so that, at the end of the cycle, practically all the sensors had been immersed in water, oil or air (the three fluids used in the classification), exception made for FBG1 and FBG7 which, due to their positions in the tank (top and bottom), it was not possible to carry out the tests with air and oil, for the case of FBG1 and water for the case of FBG7 due to limitations in the experimental conditions of removing and inserting water and oil. In any case, FIG. 1 presents the responses of each temperature sensor for the different interface level conditions. The answers could be obtained by applying the thermal conductivity analysis methodology and specific heat, this analysis is carried out from equations (1) and (2) below.

$$Q = m*Cp*0.1T, \quad (1)$$

$$k = e*(0.75 + 0.00083*p + 0.88*Cp)*(11M/11T), \quad (2)$$

Where Q is the amount of heat applied to the material, m is the body mass, Cp is the specific heat capacity of the material, and $\Delta t$ is the temperature change. Furthermore, k is the fluid thermal conductivity, p is the fluid density, and $\Delta T$ is the measurement time. Therefore, estimates of thermal conductivity and specific heat values depend on parameters that may vary or that are not known a priori, the amount of heat being the main term. Although it is possible to estimate these parameters through the thermal response analysis and fluid density profile in the tank, when observing equation (2), we can notice that the parameter used for this estimation is the temperature variation in a time interval ($\Delta t/\Delta T$). Knowing that there is a significant difference between the thermal conductivity of water (0.6 W/mK) and oils (generally around 0.1 W/mK), we can use the slope difference between the temperature curves in relation to the time (that is, the ratio between $\Delta t$ and $\Delta T$), since the objective of this analysis is to use the system thermal response to identify the interface between immiscible fluids. FIG. 1 shows the classification of the fluids for each of the sensors (FBG1-6, FBG7 is a temperature reference), where it is possible to notice that the sensors performed the correct classification of the fluids involved in the test without requiring additional information about the tank or the amount of heat introduced into the system. However, without this information, the classification is made through the wavelength curve slope (directly related to temperature) and time, where higher values are related to the water (due to its higher thermal conductivity) and lower values are related to the air.

However, there is the possibility of additional improvements to the presented methodology for interface level analysis using only the thermal response. The main improvement is related to the use of curve slope, which requires the sensor to be analyzed over a longer time interval and also has greater sensitivity to measurement noise. One way to achieve better results is to use machine learning algorithms for clustering or system classification for water, oil and air estimates. Therefore, additional cycles of increasing and decreasing the interface level were performed to obtain a greater amount of data under different conditions.

The initial configuration of the experiment consists of a fiber, containing seven FBGs temperature sensors, arranged vertically in a composite tank with 16.3 cm of oil, covering only sensor 1, as shown in FIG. 1. From this, the experiment consists of adding water to the tank so that the oil (less dense) transits through the sensors until it reaches the highest sensor. Finally, water is withdrawn until the initial setting is reached again. In the initial configuration, the sensors' responses are acquired for 5 minutes in stable mode, that is, with the oil stopped at level 1. When adding water, the sensors' responses are divided into transitional (when the pump is ON and the water level is rising) and steady (when the pump is OFF and the resulting liquid stabilizes). In both cases the sensor responses are acquired. In the case of transition, data acquisition ends when the oil reaches the expected level. In the case of stability, the data are acquired for 10 min. The same process happens when removing the water and reaching the initial setting.

From the sensor response results, two approaches are performed: level classification and fluid classification. The classification algorithm used is kNN (k-nearest neighbors). kNN is a supervised method from the field of machine learning and its classification is based on distance. In the kNN classification algorithm, data is divided into training and testing, and each test sample is compared with each training sample. Thus, the kNN method determines the class of each test sample based on the class of the k-nearest neighbors of the training group. For this reason, the kNN method has the advantage of creating the classification threshold adapted for each test group, and not linearly.

For the level classification, the kNN input data consists of 7 attributes (the responses of the 7 sensors) and 7 classes (the height levels of the 7 sensors in the tank). The data used in the classification refers to the moments of stability of the liquid, that is, the moments when water is being added or removed are excluded from the analysis. Thus, the data is randomly exchanged and divided into training (70%) and test (30%). The sorting process is repeated 10 times. The model evaluation metrics are accuracy, revocation and precision, comparing the real classes with the classes estimated by the kNN model. Accuracy represents the percentage of samples classified correctly. Revocation represents the percentage of samples of a class classified correctly relative to all actual samples of that class, while precision represents the percentage of samples of a class classified correctly relative to all estimated samples for that class. In addition, the confusion matrix was also used as a way of evaluating the model, and aims to show how many samples are real and how many are estimated for each class.

For fluid classification, each sensor is used as a classifier. Thus, each classifier has the response of the sensor in question as input data, for example, classifier 1 has the response of sensor 1 as an attribute, while classifier 2 has the response of sensor 2 as an attribute, and so on. Each classifier has 1 attribute and 3 classes (air, oil and water), except classifier 1 and 7, which have contact only with oil and water (sensor 1) or air and oil (sensor 7).

Figure 2:
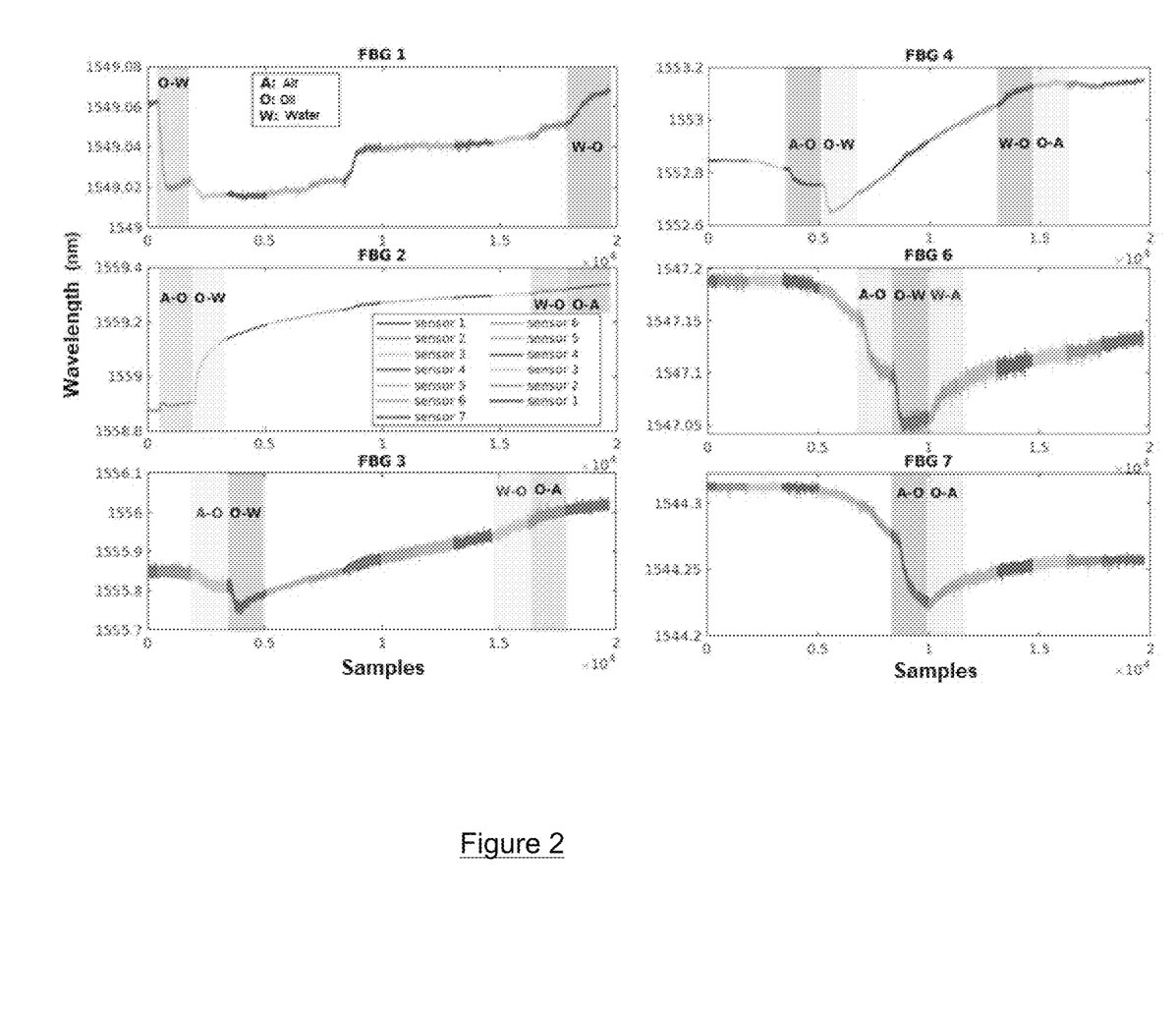
FIG. 2 illustrates the sensors response for each experiment step.

During data analysis, sensor 1 and sensor 5 showed similar wavelength peaks, which led to a cancellation of responses from sensor 5. As a result, sensor 5 was excluded from the analyses. The result of the responses of the remaining sensors (1, 2, 3, 4, 6 and 7) during all stages of the experiment can be seen in FIG. 2.

Figure 3:
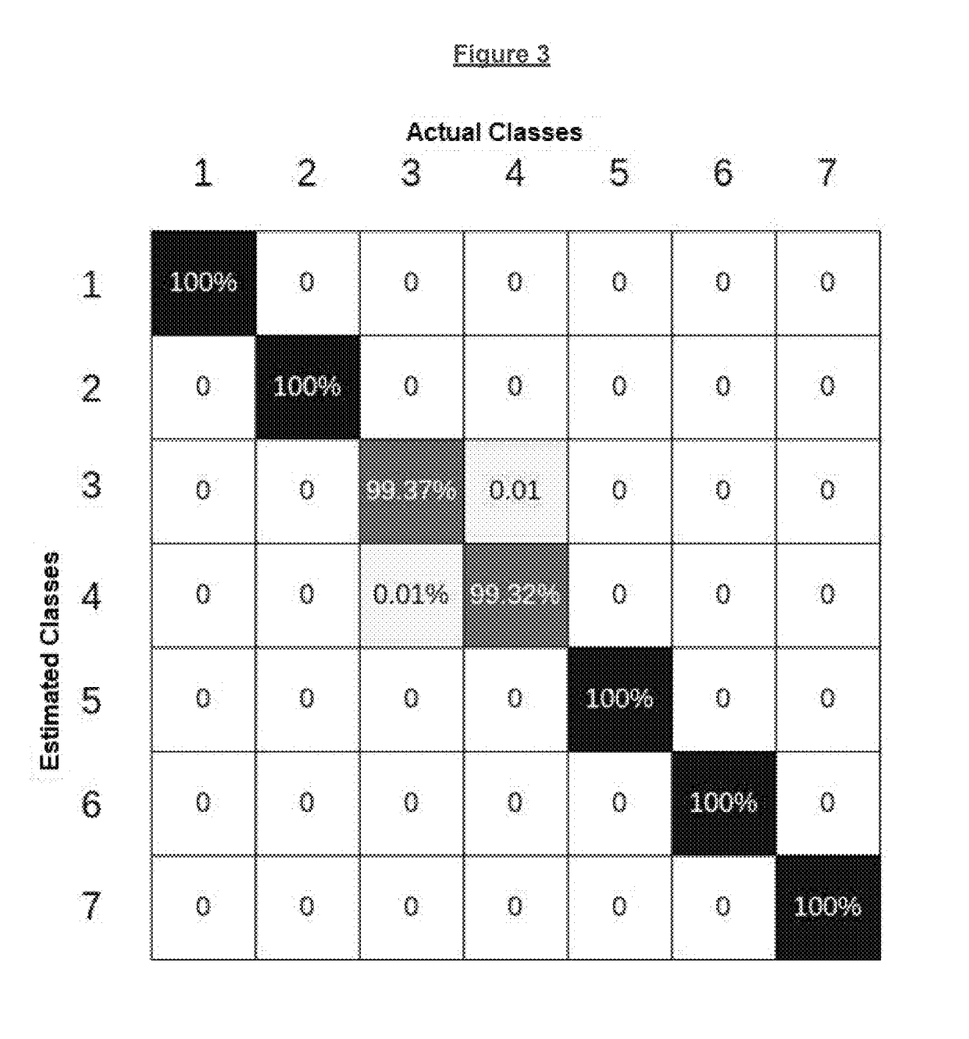
FIG. 3 illustrates the mean confusion matrix.

The results of the level classification demonstrated an average accuracy of 99.78±0.01 with k=9. The revocation and precision results are shown in the table below. Furthermore, the average confusion matrix is shown in FIG. 3.

TABLE 1

Average revocation and average precision results

|  |  | Revocation | Precision |
|---|---|---|---|
| Classes | 1 | 100% | 100% |
|  | 2 | 100% | 100% |
|  | 3 | 99.25% | 99.37% |

TABLE 1-continued

Average revocation and average precision results

| | Revocation | Precision |
|---|---|---|
| 4 | 99.42% | 99.32% |
| 5 | 100% | 100% |
| 6 | 100% | 100% |
| 7 | 100% | 100% |

Regarding fluid classification, each sensor was analyzed as a kNN model. The analyzed data correspond to the responses of the sensors in stable mode, that is, when the pump is off and the level is stopped. The accuracy results of each sensor used as a kNN classifier model were as follows:

Model kNN—FBG1 (k=1) with accuracy of 100%±0%

Model kNN—FBG2 (k=1) with accuracy of 99.99%±0.01% Model KNN-FBG3 (k=19) with accuracy of 86.14%±0.59% Model kNN-FBG4 (k=19) with accuracy of 96.17%±0.29% Model kNN—FBG6 (k=18) with accuracy of 93.52%±0.41% Model kNN—FBG7 (k=8) with an accuracy of 99.81%±0.06%

The optical system of the present invention guarantees advantages in terms of economics and productivity with lower cost sensors than the main competing technologies (radar and radiation). It has the possibility of monitoring several tanks using the same system, resulting in greater dilution of the price per sensor. It has a smaller number of elements in the sensor assembly. In addition to flexibility and customization capacity for different operating conditions.

The invention has the advantage of ensuring a smaller presence of employees in the risk areas, with sensors with intrinsic safety and adapted for classified areas.

The effects achieved by the invention also contribute to the maintenance of the environment, since the high accuracy combined with the low cost per sensor can result in less environmental damage due to the correct separation of water and oil. Operation without environmental impact, without potentially polluting elements. Technologies for recycling the materials involved in the development of the sensor are mature or in the process of maturing.

The invention claimed is:

1. An optical system for measuring a water-oil interface level from fluid thermal properties, the system comprising:
    a single-mode optical fiber comprising a Fiber Bragg Grating (FBG),
    a polytetrafluoroethylene (PTFE) tube configured to receive the single-mode optical fiber,
    a connection, wherein the FBG is positioned in the connection,
    a flange connected to the PTFE tube and configured to connect the optical system to a tank, reservoir, processing vessel, and/or storage vessel,
    an optical connector configured to connect to an optical interrogator, wherein the optical interrogator is configured to receive signals from the FBG via the optical connector.

2. The system of claim 1, wherein a UV light beam generates periodic disturbance with permanent changes in a refractive index of the single-mode optical fiber to form the FBG.

3. The system of claim 1, wherein the single-mode optical fiber comprises a set of FBGs.

4. The system of claim 1, wherein the connection provides mechanical protection for the FBG and heat exchange between a medium and the single-mode optical fiber.

5. The system of claim 1, wherein the connection is positioned between multiple PTFE tubes.

6. The system of claim 1, wherein the optical connectors is connected to a channel of the optical interrogator.

7. The system of claim 1, wherein the optical interrogator comprises a broadband optical source, an optical circulator, and a set of optical detectors.

8. The system of claim 1, the FBG (2) is embedded in a structure.

9. The system of claim 1, further comprising at least 6 equidistant FBGs.

10. The system of claim 9, further comprising a seventh FBG 25 cm above another FBG to measure temperature and air/gas temperature in a top of the tank, reservoir, processing vessel, and/or storage vessel.

* * * * *